US012005987B2

(12) United States Patent
Carnevali et al.

(10) Patent No.: US 12,005,987 B2
(45) Date of Patent: Jun. 11, 2024

(54) ACCESSORY MOUNTING DEVICE FOR GAS TANK OR FUEL CAP AND METHODS OF MAKING AND USING

(71) Applicant: National Products, Inc., Seattle, WA (US)

(72) Inventors: Jeffrey D. Carnevali, Seattle, WA (US); Stefan Michael Gottschalk, Seattle, WA (US); Lonnie Drosihn, Milton, DE (US); Matthew Bryan Heinig, Salt Lake City, UT (US)

(73) Assignee: National Products, Inc., Seattle, WA (US)

( * ) Notice: Subject to any disclaimer, the term of this patent is extended or adjusted under 35 U.S.C. 154(b) by 116 days.

(21) Appl. No.: 17/955,357

(22) Filed: Sep. 28, 2022

(65) Prior Publication Data

US 2024/0101210 A1     Mar. 28, 2024

(51) Int. Cl.
*B62J 9/25*     (2020.01)
*B62J 7/02*     (2006.01)
*B62J 35/00*    (2006.01)

(52) U.S. Cl.
CPC ............ *B62J 7/02* (2013.01); *B62J 35/00* (2013.01)

(58) Field of Classification Search
CPC ......... B62J 9/25; B62J 9/27; B62J 7/02; B62J 35/00
USPC ........................................................ 224/419
See application file for complete search history.

(56) References Cited

U.S. PATENT DOCUMENTS 8,919,624 B2 * 12/2014 Visenzi ................. B62J 9/27
                                                403/325
10,207,761 B2 * 2/2019 McKinster ........... B62J 50/225

FOREIGN PATENT DOCUMENTS

EP        3168119 A1 *  5/2017

OTHER PUBLICATIONS

EP 3168119 with translation. (Year: 2017).*

* cited by examiner

*Primary Examiner* — Adam J Waggenspack
(74) *Attorney, Agent, or Firm* — Branch Partners PLLC; Bruce E. Black

(57) ABSTRACT

A mounting device for mounting an accessory on a gas tank, fuel cap, or fuel cap flange of a vehicle includes a tank mount for attachment to the gas tank, fuel cap, or fuel cap flange, the tank mount including a mounting flange and openings for fasteners to attach the tank mount to the gas tank, fuel cap, or fuel cap flange; and an accessory mount for attachment of the accessory. The accessory mount includes a body and tabs coupled to, and disposed at different positions around, the body. The tank mount engages the accessory mount to mount the accessory on the gas tank, fuel cap, or fuel cap flange by positioning portions of the mounting flange of the tank mount between the tabs and the body. A portion of the accessory mount is configured to flex to facilitate disengagement of the accessory mount from the tank mount.

20 Claims, 5 Drawing Sheets

ACCESSORY MOUNTING DEVICE FOR GAS TANK OR FUEL CAP AND METHODS OF MAKING AND USING

FIELD

The present invention is directed to a mount for a gas tank or gas cap of a motorcycle or similar vehicle. The present invention is also directed to a mount for a bag or other arrangement on a gas tank or gas cap and methods of making and using.

BACKGROUND

Providing mounts for holding, retaining, or securing objects has proven beneficial for many different uses. For example, mounts for bags or other arrangements on a motorcycle, scooter, moped, snowmobile, or the like can be useful for a rider, particularly mounts that fit in front of the rider.

BRIEF SUMMARY

One embodiment is a mounting device for mounting an accessory on a gas tank, fuel cap, or fuel cap flange of a vehicle. The mounting device includes a tank mount configured for attachment to the gas tank, fuel cap, or fuel cap flange, the tank mount including a mounting flange and openings for fasteners to attach the tank mount to the gas tank, fuel cap, or fuel cap flange; and an accessory mount configured for attachment of the accessory, wherein the accessory mount includes a body and a plurality of tabs coupled to, and disposed at different positions around, the body, wherein the tank mount engages the accessory mount to mount the accessory on the gas tank, fuel cap, or fuel cap flange by positioning portions of the mounting flange of the tank mount between the tabs and the body, wherein a portion of the accessory mount is configured to flex to facilitate disengagement of the accessory mount from the tank mount.

In at least some embodiments, the mounting device further includes the accessory coupled, or coupleable, to the accessory mount. In at least some embodiments, the accessory includes a bag, box, or container.

In at least some embodiments, the tank mount further includes a mount body configured for engaging the gas tank, fuel cap, or fuel cap flange when the tank mount is attached to the gas tank, fuel cap, or fuel cap flange, wherein the mounting flange is disposed along at least a portion of an outer perimeter of the mount body. In at least some embodiments, the mount body defines an opening for access to the fuel cap. In at least some embodiments, the tank mount is configured so that the fuel cap is removable from the gas tank with the tank mount remaining attached to the gas tank, fuel cap, or fuel cap flange.

In at least some embodiments, a one of the tank mount or the accessory mount includes at least one alignment pin and another one of the tank mount or the accessory mount includes at least one alignment hole, wherein engagement of the at least one alignment pin and the at least one alignment hole facilitates alignment of the accessory mount to the tank mount. In at least some embodiments, a one of the tank mount or the accessory mount includes at least one alignment extension and another one of the tank mount or the accessory mount includes at least one alignment notch, wherein engagement of the at least one alignment extension and the at least one alignment notch facilitates alignment of the accessory mount to the tank mount.

In at least some embodiments, the accessory mount includes a plurality of alignment walls extending from the body of the accessory mount to facilitate alignment of the accessory mount to the tank mount. In at least some embodiments, the plurality of tabs includes at least one front tab disposed on a front portion of the accessory mount and at least one rear tab disposed on a rear portion of the accessory mount.

In at least some embodiments, the accessory mount further includes an accessory strap coupled to the body of the accessory mount and configured to pass through opposing openings in the accessory. In at least some embodiments, the accessory mount further includes a strap retainer coupled to the body and configured for attachment of the accessory strap. In at least some embodiments, the strap retainer includes a retainer body, a retainer bar attached to the retainer body, and an opening between a portion of the retainer body and the retainer bar, wherein the accessory strap is attached, or attachable, to the strap retainer by passage of a portion of the accessory strap through the opening and around the retainer bar. In at least some embodiments, the accessory mount includes at least one curved hinge coupling the strap retainer and at least one of the tabs to the body, wherein pulling on the accessory strap flexes the at least one curved hinge to move the at least one of the tabs away from the body to facilitate disengagement of the tank mount from the accessory mount. In at least some embodiments, the accessory mount further includes an endpiece coupled to an end of the accessory strap and configured to maintain extension of the accessory strap through the opposing openings of the accessory.

In at least some embodiments, the tank mount further includes fasteners for fastening the tank mount to the gas tank, fuel cap, or fuel cap. In at least some embodiments, the tank mount further includes fasteners for fastening the accessory mount to the accessory.

Another embodiment is a method for mounting an accessory on a gas tank, fuel cap, or fuel cap of a vehicle. The method includes providing the tank mount of any of the mounting devices described above on the gas tank, fuel cap, or fuel cap; and engaging the accessory mount with the tank mount so that portions of the mounting flange of the tank mount are disposed between the tabs and the body of the accessory mount.

In at least some embodiments, providing the tank mount includes attaching the tank mount to the gas tank, fuel cap, or fuel cap. In at least some embodiments, the method further includes disengaging the accessory mount from the tank mount by pulling on an accessory strap of the accessory mount to flex at least one of the tabs away from the body of the accessory mount and at least partially release the mounting flange of the tank mount.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to a mount for a gas tank or gas cap of a motorcycle or similar vehicle. The present invention is also directed to a mount for a bag or other arrangement on a gas tank or gas cap and methods of making and using.

Figure 1:
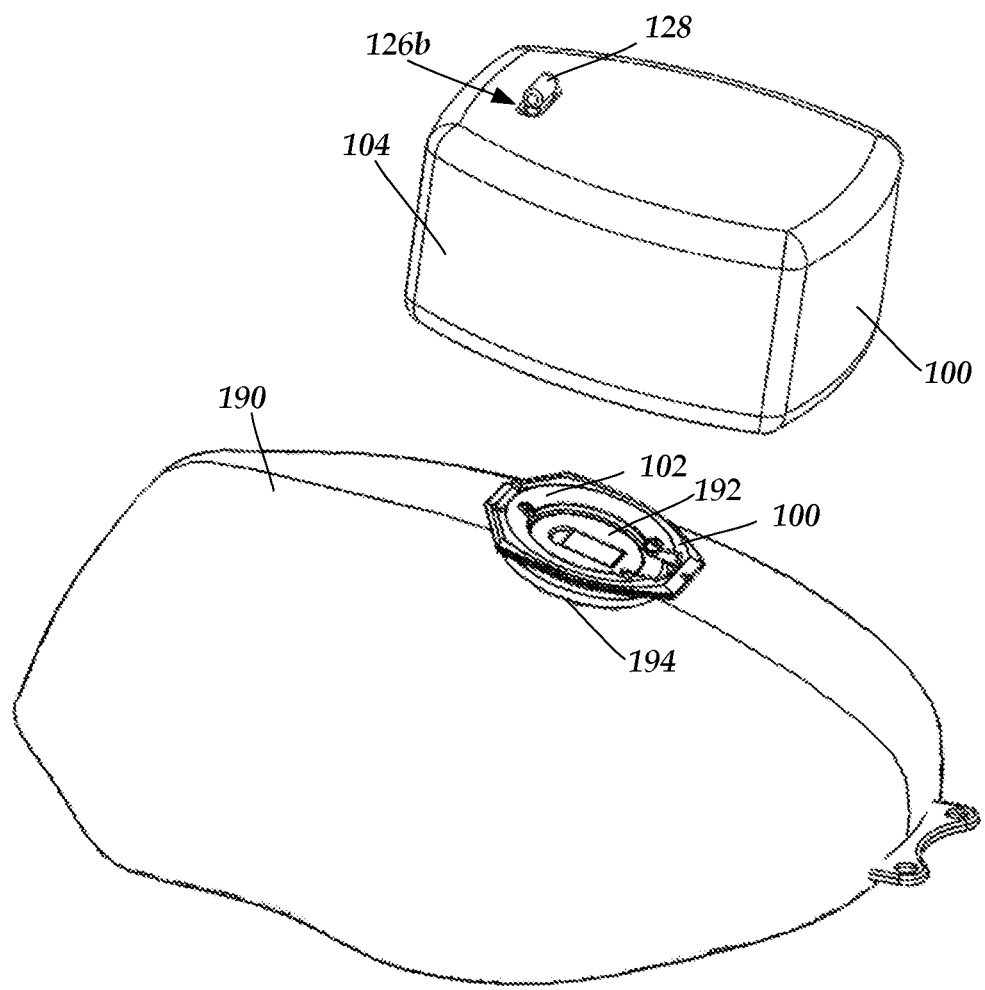
FIG. 1 is a schematic perspective side view of one embodiment of a mounting device for a gas tank or fuel cap and an accessory attached to the mounting device, according to the invention.

FIG. 1 illustrates a gas tank 190 of a motorcycle, scooter, moped, snowmobile, or other vehicle including a fuel cap 192 and an optional fuel cap flange 194. A mounting device 100 includes a tank mount 102, an accessory 104 (for example, a bag as illustrated in FIG. 1), and an accessory mount 106 (FIG. 5) for mounting the accessory on the gas tank 190 or fuel cap 192 of the vehicle. In at least some embodiments, the tank mount 102 and accessory mount 106 are made of a relatively rigid plastic or metal material or any combination thereof.

Figure 4:
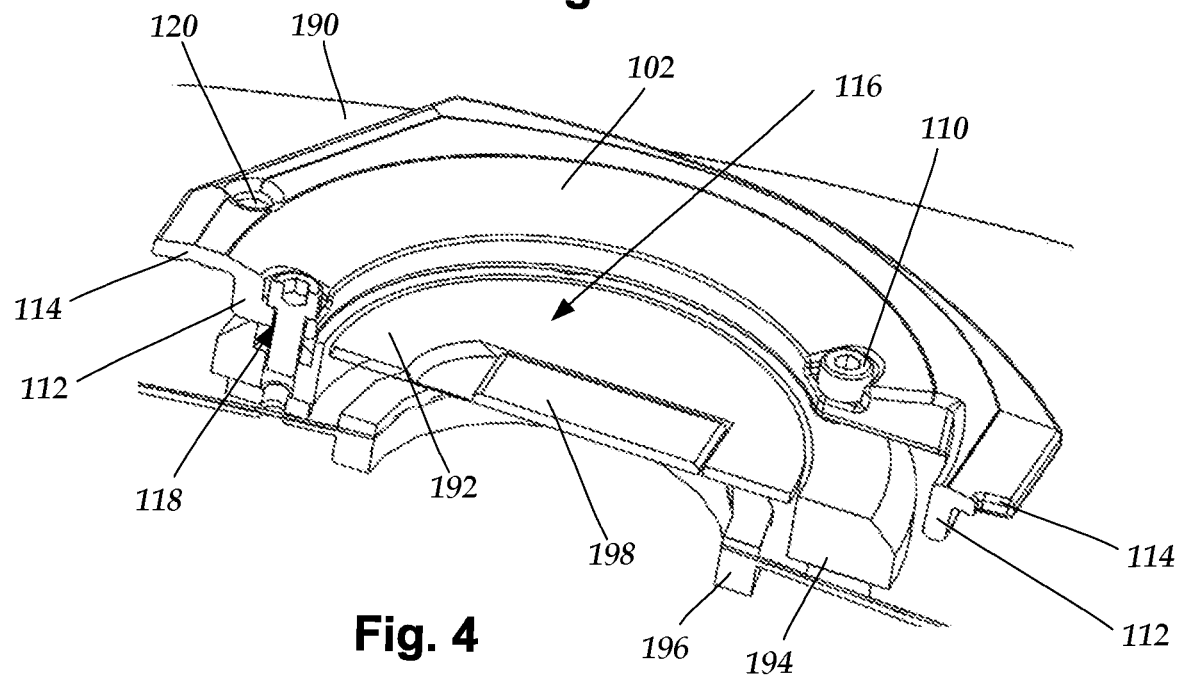
FIG. 4 is a schematic cross-sectional view of the tank mount and gas tank or fuel cap of FIG. 3, according to the invention.
Figure 2:
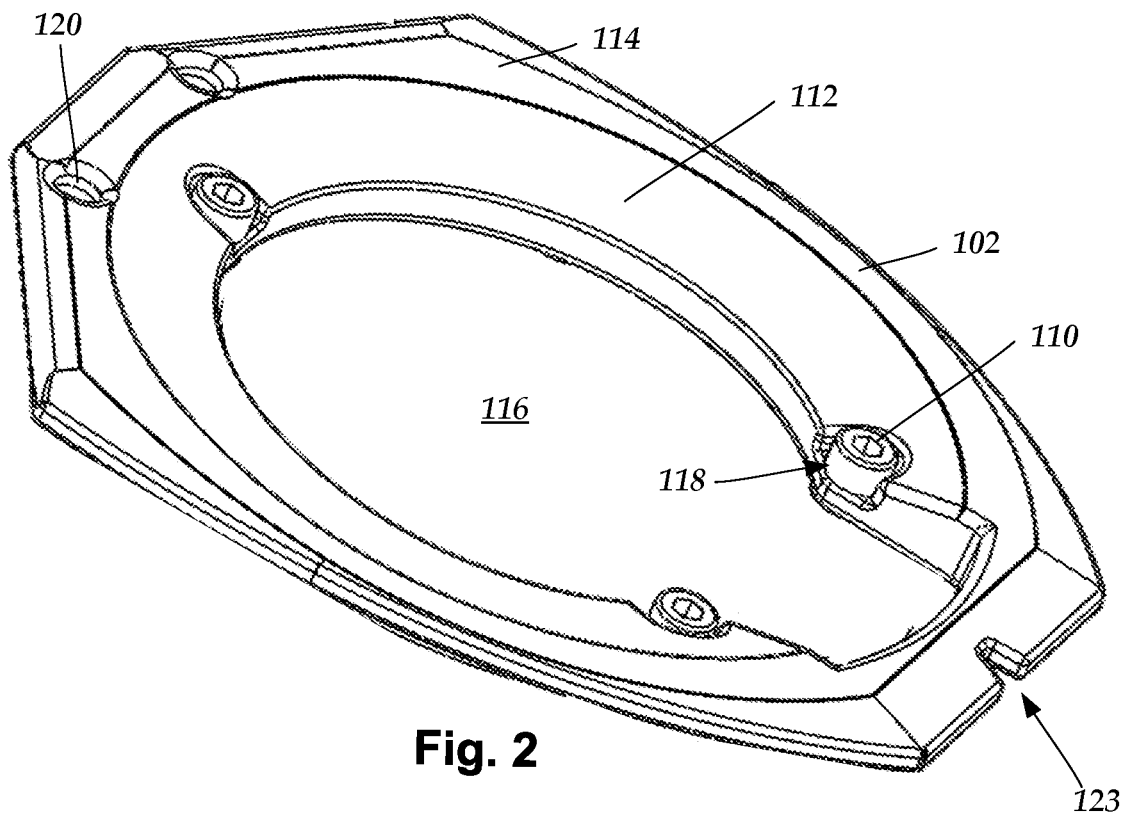
FIG. 2 is a schematic perspective top view of one embodiment of a tank mount of the mounting device, according to the invention.
Figure 3:
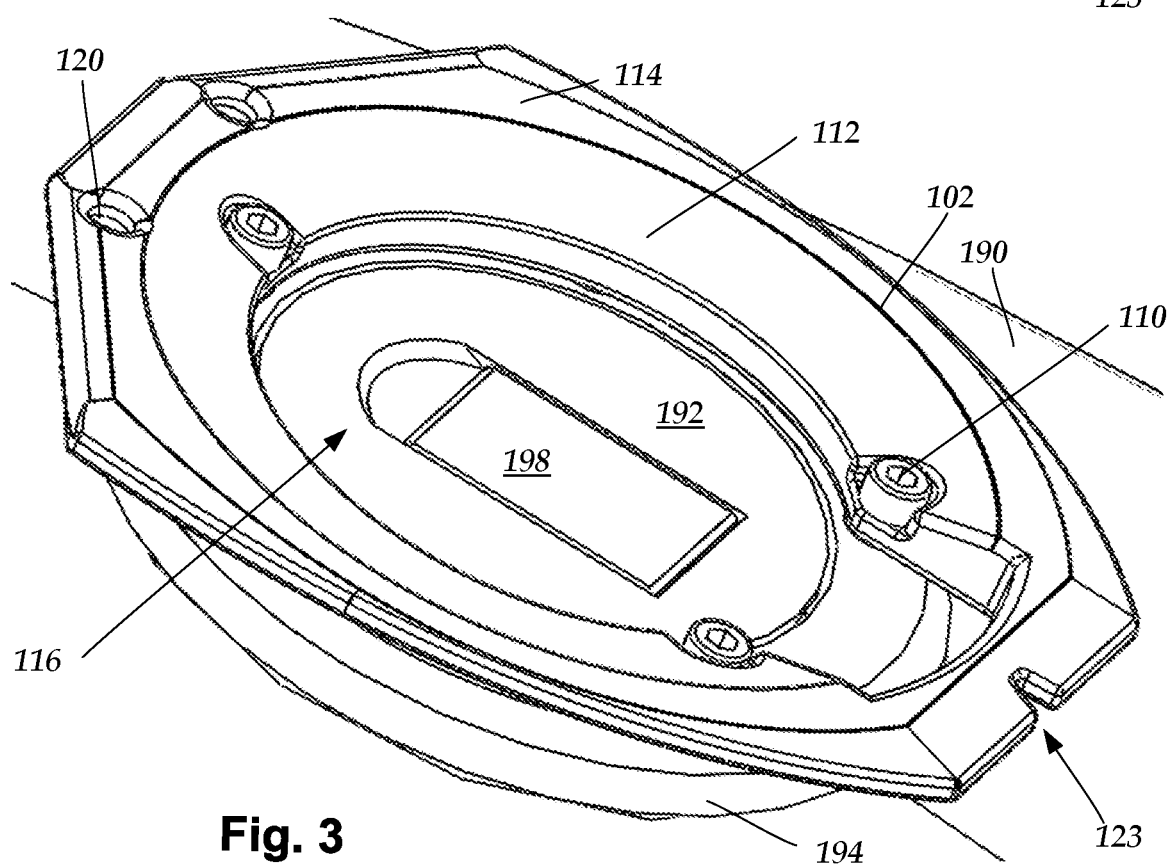
FIG. 3 is a schematic perspective top view of the tank mount of FIG. 2 mounted to a gas tank or fuel cap, according to the invention.

FIG. 2 illustrates one embodiment of the tank mount 102. FIG. 3 illustrates the tank mount 102 attached to the gas tank 190 or fuel cap 192 of a vehicle. For example, the tank mount 102 can be attached to the gas tank 190, the fuel cap 192, or the fuel cap flange 194 utilizing fasteners 110, such as screws, bolts, or the like. FIG. 4 is a cross-sectional view of the tank mount 102, fuel cap 192, fuel cap flange 194, and a wall 196 of the gas tank 190.

The tank mount 102, as illustrated in cross-section in FIG. 4, includes a mount body 112 that surrounds an opening 116 that exposes the fuel cap 192 (as illustrated in FIGS. 1 and 3) and an optional fuel cap handle 198. In at least some embodiments, the mount body 112 contacts the gas tank 190, fuel cap 192, or fuel cap flange 194 (or any combination thereof) when the tank mount 102 is mounted. In at least some embodiments, the fuel cap 192 can be opened or removed without removing the tank mount 102.

The tank mount 102 also include a mounting flange 114 that is disposed fully or partially around an outer perimeter of the mount body 112. The mounting flange 114 can be thinner than the mount body 112 and is spaced apart from the gas tank 190, fuel cap 192, or fuel cap flange 194 (or any combination thereof) when the tank mount 102 is mounted.

Figure 7:
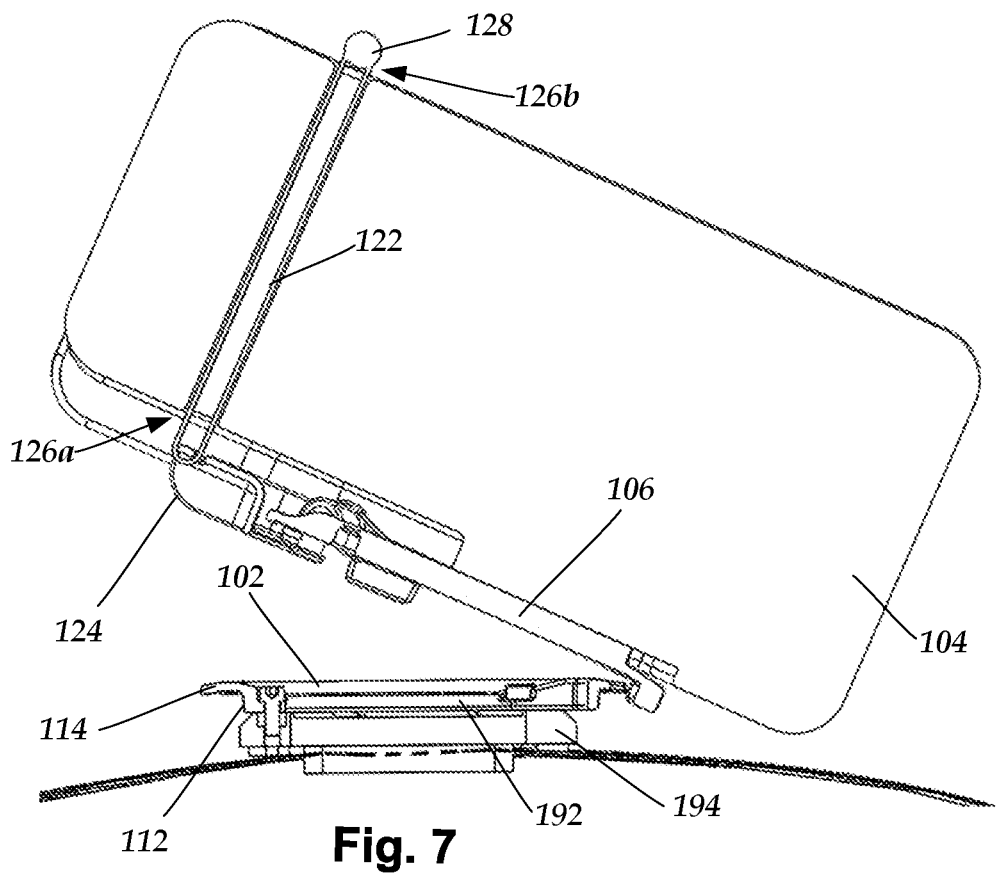
FIG. 7 is a schematic perspective cross-sectional view of the tank mount and gas tank or fuel cap of FIG. 2 and the accessory mount and accessory of FIG. 5 as the tank mount and accessory mount are initially engaged, according to the invention.
Figure 8:
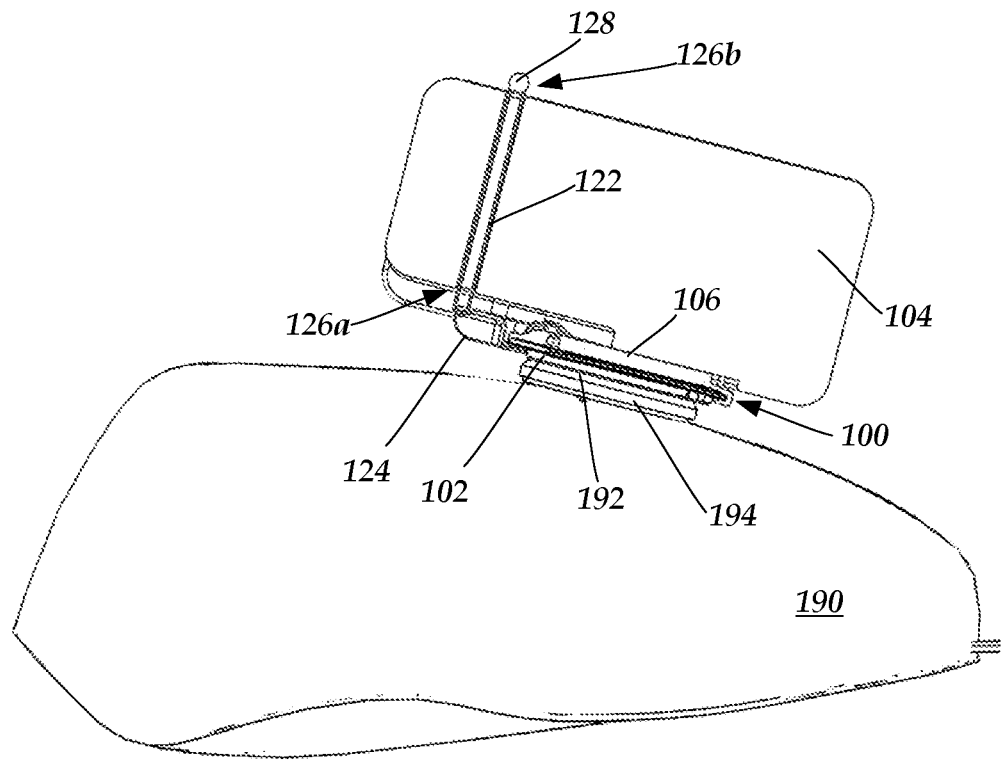
FIG. 8 is a schematic side view of the arrangement of FIG. 7 with the tank mount and accessory mount fully engaged, according to the invention.

The mounting flange 114 is arranged to engage with one or more tabs 136 (FIG. 5) of the accessory mount 106 (see, for example, FIGS. 7 and 8) when the tank mount 102 and the accessory mount are coupled together in the engaged position (FIG. 8.)

The tank mount 102 also includes one or more fastener holes 118 for the fasteners 110. In the illustrated embodiment, the tank mount 102 has three fastener holes 118—one fastener hole at the front of the tank mount 102 and two fastener holes near the rear of the tank mount. In at least some embodiments, one or more (or all) of the fastener holes 118 are countersunk to accommodate the head of the fastener 110.

Figure 5:
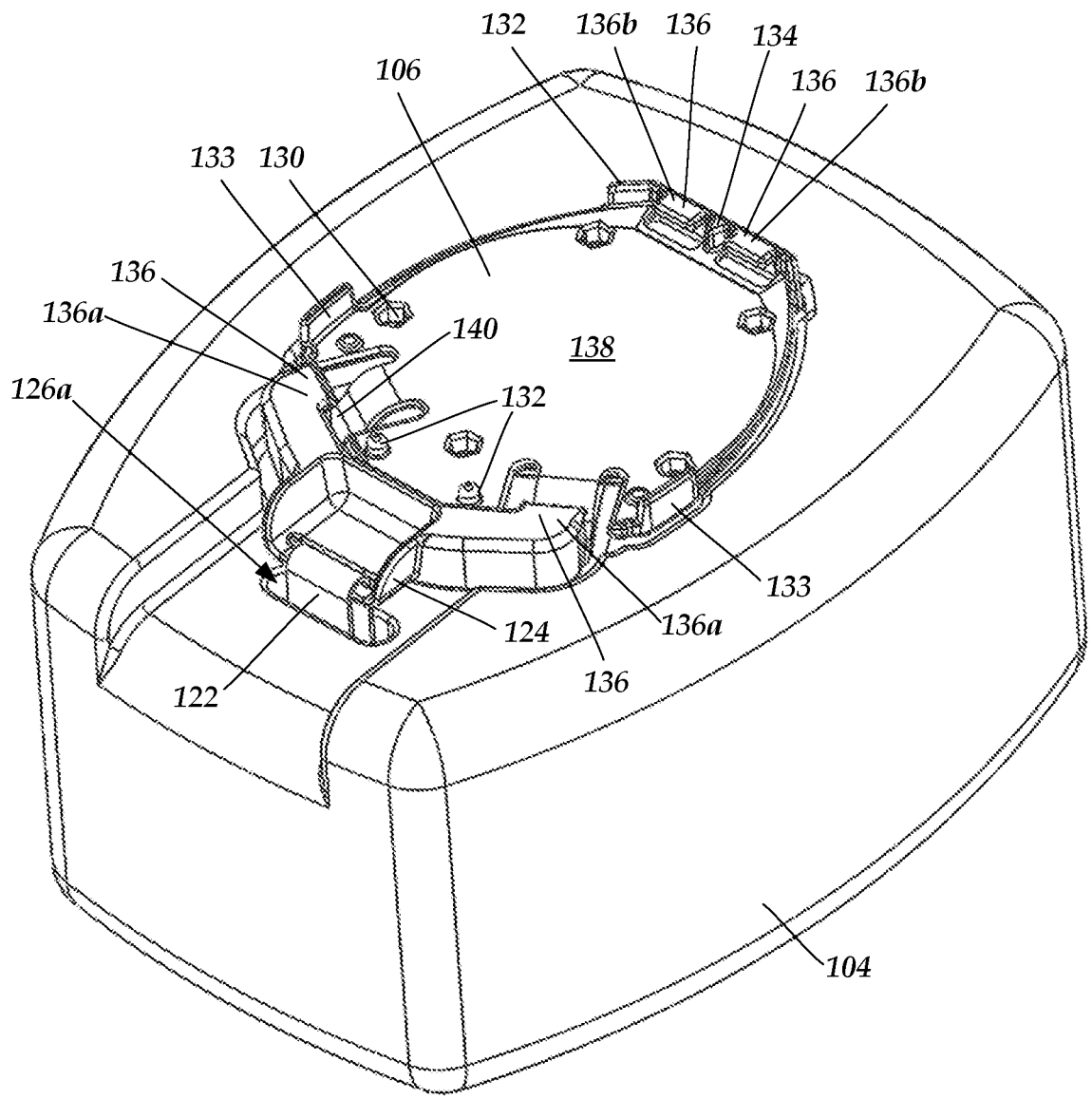
FIG. 5 is a schematic perspective bottom view of one embodiment of an accessory mount of the mounting device attached to an accessory, according to the invention.

In at least some embodiments, the tank mount 102 includes one or more alignment holes 120 for receiving one or more alignment pins 132 (FIG. 5) on the accessory mount 106 (FIG. 5). It will be understood that, in at least some other embodiments, the tank mount 102 can include the alignment pin(s) and the accessory mount 106 can include the alignment hole(s). In yet other embodiments, both the tank mount 102 and the accessory mount 106 can include one or more alignment pins and one or more alignment holes. The alignment holes 120 are arranged to receive the alignment pins 132 (FIG. 5) when the tank mount 102 and the accessory mount 106 are fully engaged (see, FIG. 8 which displays full engagement.)

In at least some embodiments, the tank mount 102 includes one or more alignment notches 123 for receiving one or more alignment extensions 134 (FIG. 5) on the accessory mount 106 (FIG. 5). It will be understood that, in at least some other embodiments, the tank mount 102 can include the alignment extension(s) and the accessory mount 106 can include the alignment notch(es) or any other suitable arrangement of the alignment extension(s) and alignment notch(es).

Figure 6:
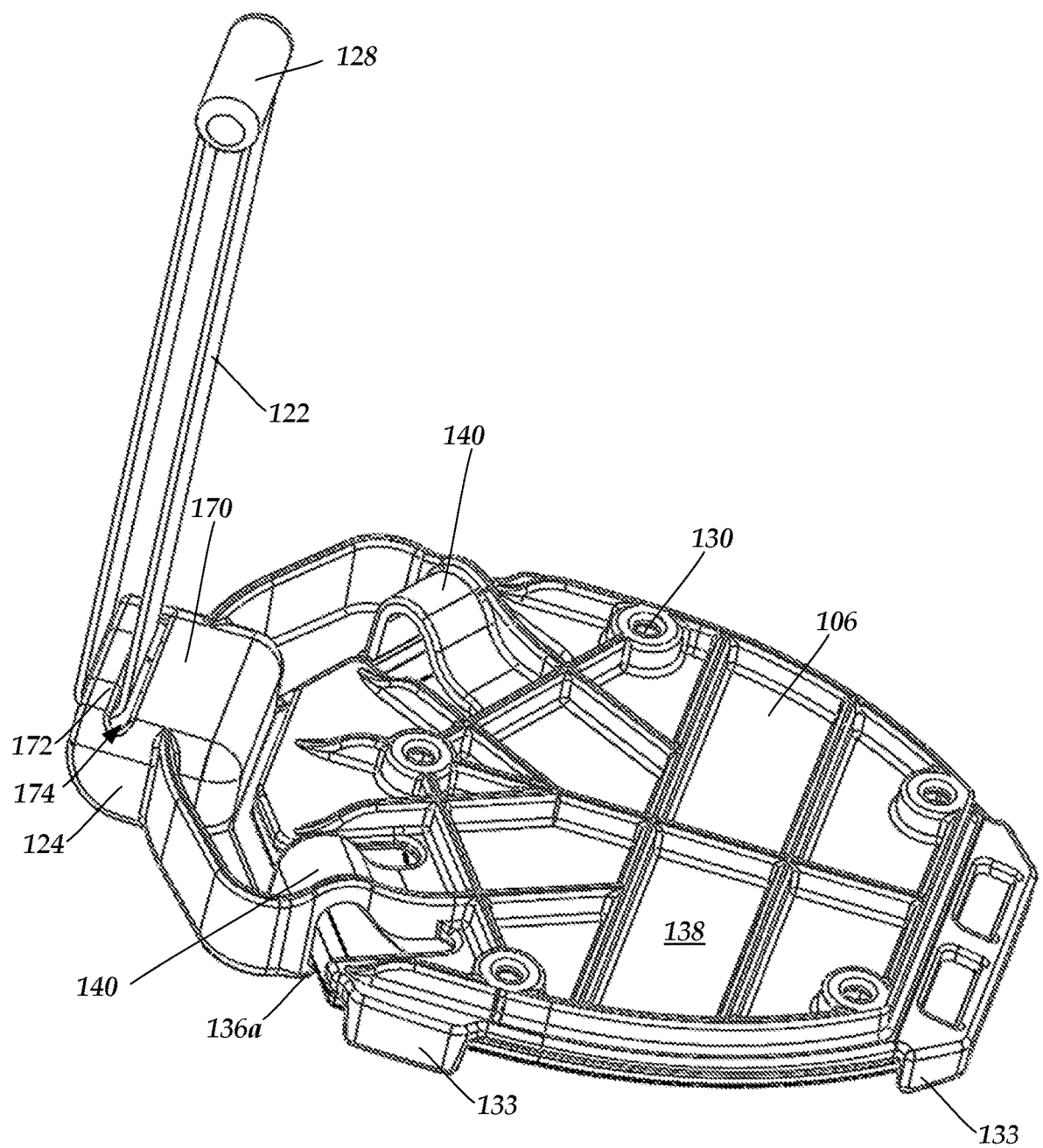
FIG. 6 is a schematic perspective top view of the accessory mount of FIG. 5, according to the invention.

FIG. 5 illustrates the accessory 104 attached to the accessory mount 106. FIG. 6 illustrates the accessory mount 106 from the opposite side. An accessory strap 122 is attached to a strap retainer 124 of the accessory mount 106, as illustrated in FIGS. 5 and 6, and extends through opposing openings 126a, 126b in the accessory 106, as illustrated in FIG. 7. An endpiece 128 is attached to the accessory strap 122 to maintain the extension of the accessory strap through the opposing openings 126a, 126b in the accessory 106. In at least some embodiments, the strap retainer 124 comprises a retainer body 170, a retainer bar 172 attached to the retainer body, and an opening 174 between a portion of the retainer bar and the retainer body. In at least some embodiments, the accessory strap 122 extends through the opening 174 and around the retainer bar 172 to couple the accessory strap to the strap retainer 124. It will be understood that any other suitable method or arrangement for coupling the accessory strap 122 to the strap retainer 124 can be used.

In at least some embodiments, the accessory 104 can be a bag, box, container, or any other suitable enclosure. The accessory 104 can be made of flexible, semi-rigid, or rigid materials or any combination thereof.

Returning to FIG. 5, the accessory mount 106 includes openings 130 through which any suitable fasteners can be disposed to attach the accessory mount to the accessory 104 (optionally using a plate or other component disposed within the accessory.) Examples of fasteners can include, but are not limited to, screws, bolts, staples, thread, adhesive, or the like or any combination thereof. Any other suitable components or method for attachment of the accessory mount 106 to the accessory 104 can be used. In at least some embodiments, the accessory 104 is removably attached to the accessory mount 106 so that the accessory 104 can be removed from the accessory mount by non-destructively unfastening the accessory from the accessory mount. In at least some embodiments, the accessory 104 is permanently attached to the accessory mount so that the accessory cannot be removed from the accessory mount without destroying or damaging the accessory, accessory mount, fasteners, or any combination thereof.

In at least some embodiments, the accessory mount 106 includes one or more alignment pins 132 to facilitate alignment of the accessory mount 106 to the tank mount 102, as described in more detail above. In at least some embodiments, the accessory mount 106 includes one or more alignment extensions 134 to facilitate alignment of the accessory mount 106 to the tank mount 102, as described in more detail above. In at least some embodiments, the accessory mount 106 includes one or more alignment walls 133 to facilitate alignment of the accessory mount 106 to the tank mount 102.

In at least some embodiments, the accessory mount 106 includes a body 138 and one or more tabs 136 for receiving and retaining portions of the mounting flange 114 of the tank mount 102 when the tank mount is fully engaged with the accessory mount. For example, when fully engaged, portions of the mounting flange 114 are disposed between the tabs 136 and the body 138 of the accessory mount 106 and resist separation of the tank mount 102 from the accessory mount.

In at least some embodiments, the tabs 136 include one or more front tabs 136a and one or more rear tabs 136b. In at least some embodiments, in operation, one or more rear tabs 136b of the accessory mount 106 can be slid over a rear portion of the mounting flange 114 of the tank mount 102 and then then a front portion of the mounting flange can be pushed past one or more front tabs 136a of the accessory mount. In at least some embodiments, a clicking sound can indicate full engagement of the tank mount 102 and accessory mount 106.

In at least some embodiments, the front tabs 136a can be disengaged from the mounting flange 114 of the tank mount 102 by pulling on the endpiece 128 or strap 122 which flexes the strap retainer 124 and front tabs 136a upwards and away from the body 138. In at least some embodiments, the front tabs 136a and strap retainer 124 are coupled to the body 138 by one or more curved hinges 140 that facilitate the flexing despite the relatively rigid material that forms the accessory mount 106.

In at least some embodiments, the rear tabs 136b can remain engaged with the mounting flange 114 allowing the accessory mount 106 and accessory to pivot with the rear tabs 136b defining the pivot point, as illustrated in FIG. 7. In at least some embodiments, the mounting flange 114 can be readily disengaged from the rear tabs 136b after disengagement of the front tabs 136a by moving the accessory mount 106 forward relative to the tank mount 102 to slide the rear portion of the tank mount out from under the rear tabs.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A mounting device for mounting an accessory on a gas tank, fuel cap, or fuel cap flange of a vehicle, the mounting device comprising:

a tank mount configured for attachment to the gas tank, fuel cap, or fuel cap flange, the tank mount comprising a mounting flange and openings for fasteners to attach the tank mount to the gas tank, fuel cap, or fuel cap flange; and an accessory mount configured for attachment of the accessory, wherein the accessory mount comprises a body, a plurality of tabs coupled to, and disposed at different positions around, the body, and an accessory strap coupled to the body of the accessory mount and configured to pass through opposing openings in the accessory, wherein the tank mount engages the accessory mount to mount the accessory on the gas tank, fuel cap, or fuel cap flange by positioning portions of the mounting flange of the tank mount between the tabs and the body, wherein a portion of the accessory mount is configured to flex to facilitate disengagement of the accessory mount from the tank mount.

2. The mounting device of claim 1, further comprising the accessory coupled, or coupleable, to the accessory mount.

3. The mounting device of claim 2, wherein the accessory comprises a bag, box, or container.

4. The mounting device of claim 1, wherein the tank mount further comprises a mount body configured for engaging the gas tank, fuel cap, or fuel cap flange when the tank mount is attached to the gas tank, fuel cap, or fuel cap flange, wherein the mounting flange is disposed along at least a portion of an outer perimeter of the mount body.

5. The mounting device of claim 4, wherein the mount body defines an opening for access to the fuel cap.

6. The mounting device of claim 5, wherein the tank mount is configured so that the fuel cap is removable from the gas tank with the tank mount remaining attached to the gas tank, fuel cap, or fuel cap flange.

7. The mounting device of claim 1, wherein a one of the tank mount or the accessory mount comprises at least one alignment pin and another one of the tank mount or the accessory mount comprises at least one alignment hole, wherein engagement of the at least one alignment pin and the at least one alignment hole facilitates alignment of the accessory mount to the tank mount.

8. The mounting device of claim 1, wherein a one of the tank mount or the accessory mount comprises at least one alignment extension and another one of the tank mount or the accessory mount comprises at least one alignment notch, wherein engagement of the at least one alignment extension and the at least one alignment notch facilitates alignment of the accessory mount to the tank mount.

9. The mounting device of claim 1, wherein the accessory mount comprises a plurality of alignment walls extending from the body of the accessory mount to facilitate alignment of the accessory mount to the tank mount.

10. The mounting device of claim 1, wherein the plurality of tabs comprises at least one front tab disposed on a front portion of the accessory mount and at least one rear tab disposed on a rear portion of the accessory mount.

11. The mounting device of claim 1, wherein the accessory mount further comprises a strap retainer coupled to the body and configured for attachment of the accessory strap.

12. The mounting device of claim 11, wherein the strap retainer comprises a retainer body, a retainer bar attached to the retainer body, and an opening between a portion of the retainer body and the retainer bar, wherein the accessory strap is attached, or attachable, to the strap retainer by passage of a portion of the accessory strap through the opening and around the retainer bar.

13. The mounting device of claim 11, wherein the accessory mount comprises at least one curved hinge coupling the strap retainer and at least one of the tabs to the body, wherein pulling on the accessory strap flexes the at least one curved hinge to move the at least one of the tabs away from the body to facilitate disengagement of the tank mount from the accessory mount.

14. The mounting device of claim 1, the accessory mount further comprises an endpiece coupled to an end of the accessory strap and configured to maintain extension of the accessory strap through the opposing openings of the accessory.

15. The mounting device of claim 1, further comprising fasteners for fastening the tank mount to the gas tank, fuel cap, or fuel cap flange.

16. The mounting device of claim 1, further comprising fasteners for fastening the accessory mount to the accessory.

17. A method for mounting an accessory on a gas tank, fuel cap, or fuel cap flange of a vehicle, the method comprising
providing the tank mount of the mounting device of claim 1 on the gas tank, fuel cap, or fuel cap flange; and
engaging the accessory mount with the tank mount so that portions of the mounting flange of the tank mount are disposed between the tabs and the body of the accessory mount.

18. The method of claim 17, wherein providing the tank mount comprises attaching the tank mount to the gas tank, fuel cap, or fuel cap flange.

19. The method of claim 17, further comprising disengaging the accessory mount from the tank mount by pulling on the accessory strap of the accessory mount to flex at least one of the tabs away from the body of the accessory mount and at least partially release the mounting flange of the tank mount.

20. The method of claim 17, wherein the accessory mount comprises at least one curved hinge coupling a strap retainer, which is coupled to the body and configured for attachment of the accessory strap, and at least one of the tabs to the body, wherein pulling on the accessory strap flexes the at least one curved hinge to move the at least one of the tabs away from the body to facilitate disengagement of the tank mount from the accessory mount.

* * * * *